(12) United States Patent
Hencken et al.

(10) Patent No.: US 8,266,970 B2
(45) Date of Patent: Sep. 18, 2012

(54) METHOD FOR OPERATING A FLOWMETER

(75) Inventors: Kai Hencken, Loerrach (DE); Hans-Werner Schwiderski, Noerten-Hardenberg (DE); Harald Grothey, Goettingen (DE); Daniel Schrag, Lufingen (CH)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 12/621,159

(22) Filed: Nov. 18, 2009

(65) Prior Publication Data
US 2010/0122582 A1   May 20, 2010

(30) Foreign Application Priority Data
Nov. 19, 2008   (DE) .......................... 10 2008 057 964

(51) Int. Cl.
*G01F 1/58* (2006.01)
(52) U.S. Cl. .................................... 73/861.15
(58) Field of Classification Search ............... 73/861.12, 73/861.15
See application file for complete search history.

(56) References Cited

U.S. PATENT DOCUMENTS

| | | | |
|---|---|---|---|
| 6,431,011 B1 * | 8/2002 | Feller | 73/861.12 |
| 6,722,207 B1 * | 4/2004 | Feller | 73/861.12 |
| 7,646,212 B2 * | 1/2010 | Sung et al. | 326/30 |
| 7,971,493 B2 * | 7/2011 | Hencken et al. | 73/861.12 |
| 2005/0115334 A1 | 6/2005 | Brockhaus et al. | |
| 2008/0016967 A1 | 1/2008 | Schrag et al. | |
| 2009/0205439 A1 * | 8/2009 | Hencken et al. | 73/861.12 |

FOREIGN PATENT DOCUMENTS

| | | |
|---|---|---|
| DE | 25 25 387 A1 | 12/1976 |
| DE | 44 37 275 C2 | 2/1997 |
| DE | 196 37 716 C1 | 4/1998 |
| DE | 101 18 002 A1 | 10/2002 |
| DE | 103 56 007 B3 | 7/2005 |
| DE | 2006 033 112 A1 | 1/2008 |

OTHER PUBLICATIONS

German Examination Report dated Jul. 21, 2009.

* cited by examiner

*Primary Examiner* — Jewel V Thompson
(74) *Attorney, Agent, or Firm* — Buchanan Ingersoll & Rooney PC

(57) ABSTRACT

A method is disclosed for operating a flowmeter, such as an inductive flowmeter, in which a medium flows through a measuring tube, and an arrangement of electrodes are conductively connected to the medium. To determine a filling level in a simple and reliable manner, at least four electrodes are arranged in the measuring tube essentially in a half-circumferential region based on a cross section through the measuring tube. When at least one signal is fed in at one of the electrodes or at one of the electrode pairs, an electrical current is measured at an electrode or between an electrode pair. An electrical voltage is measured between at least one other electrode pair or with respect to a common connection to ground. When comparing measurements with two different electrode combinations, different voltage and current values are related to infer a diagnosis, such as a filling level in the tube, and/or an electrode coating, and/or an oblique installation, and/or a sedimentation at a bottom of the tube. The diagnosis can be used to correct a flow rate.

20 Claims, 3 Drawing Sheets

METHOD FOR OPERATING A FLOWMETER

RELATED APPLICATIONS

This application claims priority under 35 U.S.C. §119 to German Patent Application No. 10 2008 057 964.5 filed in Germany on Nov. 19, 2008, the entire content of which is hereby incorporated by reference in its entirety.

FIELD

The disclosure relates to a method for operating a flowmeter, such as an inductive flowmeter in which a medium flows through a measuring tube, and an arrangement of electrodes which are conductively connected to the medium depending on the filling level.

BACKGROUND INFORMATION

Flowmeters are known. Many of these devices have been provided with functions to determine further parameters in addition to an actual flow rate measurement. One example can be gathered from the laid-open specification DE 10 118 002. In this document, an AC signal is additionally applied to at least one of the electrodes in a corresponding device and the impedance is measured at the electrode to diagnose the device. This means that the signal which has been fed in and the resultant response function, which is determined in the form of an impedance, are ultimately measured at the same electrode(s).

Further examples are disclosed in DE 196 37716.

In addition, there are magnetic flowmeters which are able to measure a flow rate even in the case of partially filled tubes. For this purpose, in addition to the actual flow rate measurement which constitutes a velocity measurement, the filling level of the medium is additionally determined and is used to determine a volumetric flow rate. A multiplicity of measuring techniques can be used to determine the filling level. It is known in practice to use a separate capacitive measuring method for this purpose. In contrast, the filling level can be determined using an inhomogeneous magnetic field. It is also known practice to determine the filling level by feeding in a current between two electrodes and forming a voltage ratio at two respective further electrode pairs.

In this case, the stated method assumes that at least six electrodes or three electrode pairs are in contact with the medium. If this is no longer the case with low filling levels, the voltage ratio can, in principle, also be formed between two electrode pairs, the current being simultaneously fed in at an electrode pair. A high degree of sensitivity of the device is desired for sensitive measurement of the flow rate and, if appropriate, the detection of disturbing effects. The fact that signals which are fed in and output are measured at the same electrode(s) in this known case results in an incorrect current or voltage measurement. The device thus loses some of its metrological sensitivity.

In addition, a desire to also determine, if appropriate, parameters which only indirectly affect the measurement of the flow rate, such as electrical conductivity of the medium, electrode deposits, etc., in addition to the flow rate has in the meantime been imposed on flowmeters. Therefore, it is of interest not only to be able to determine a filling level by a measurement but also to be able to detect or correct further parameters which may distort the measurement. In this case too, it is desirable to avoid a measurement at an electrode loaded by the incorrect current or voltage measurement in order to be able to carry out such accompanying diagnosis at all.

SUMMARY

A method for operating a flowmeter is disclosed, comprising: supplying a medium through a measuring tube and an arrangement of electrodes which are conductively connected to the medium depending on a filling level, wherein a total of at least four electrodes are arranged in the measuring tube essentially in a half-circumferential region based on a cross section through the measuring tube; measuring an electrical current at one of the electrodes or between a pair of the electrodes when at least one signal is fed in at the electrodes; measuring an electrical voltage between at least one other pair of the electrodes or with respect to a common connection to ground; relating different voltage and current values when comparing measurements with two different electrode combinations to infer a diagnosis; and correcting a flow rate based on the diagnosis.

A method for operating a flowmeter is disclosed, comprising: supplying a medium through a measuring tube and an arrangement of electrodes which are conductively connected to the medium depending on a filling level, wherein at least four electrodes are arranged essentially within a half-circumferential region of the measuring tube; measuring an electrical current at one of the electrodes or between a pair of the electrodes when at least one signal is fed in at the electrodes; measuring an electrical voltage between at least one other pair of the electrodes or with respect to a common connection to ground; comparing measurements with two different electrode combinations to infer a diagnosis; and correcting a flow rate based on the diagnosis.

BRIEF DESCRIPTION OF THE DRAWINGS

The disclosure is explained using exemplary embodiments as illustrated in the drawings, in which.

DETAILED DESCRIPTION

Figure 1:
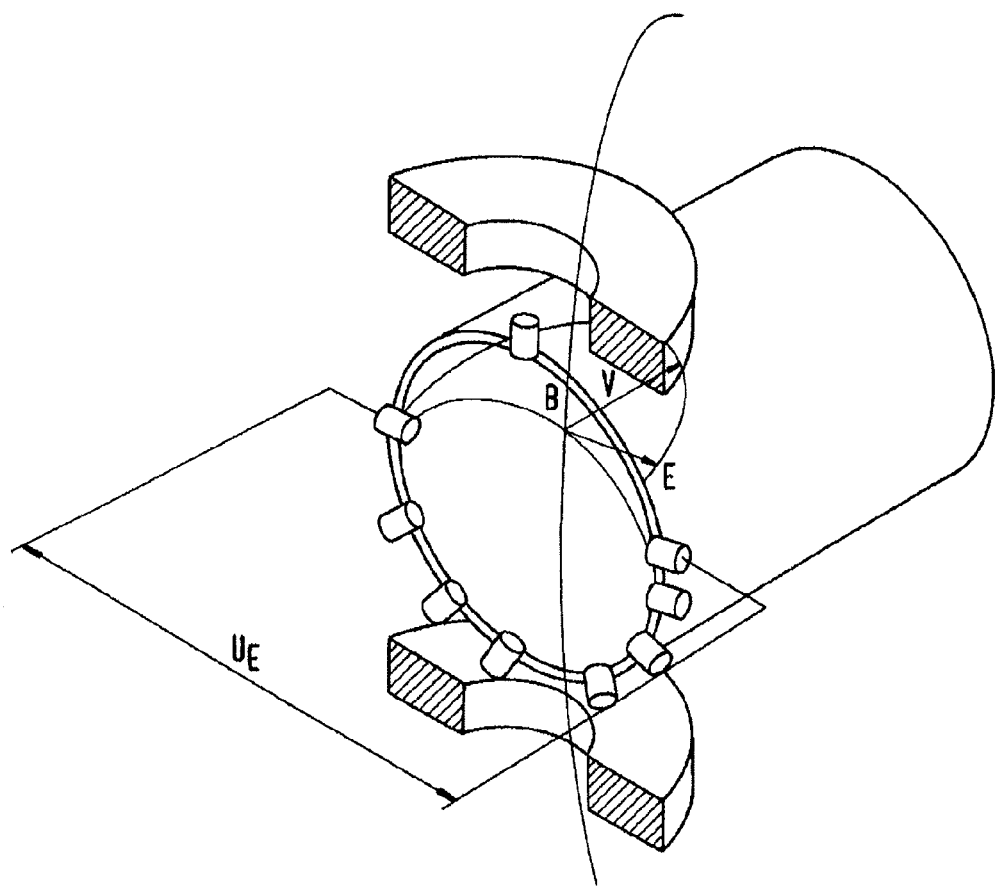
FIG. 1: shows a perspective illustration of an exemplary arrangement according to the disclosure with a distribution of the electrodes.

A flowmeter is disclosed which can reliably determine a filling level with a smaller number of electrodes. The filling level can be determined in a more accurate manner, and the electronics used can be simplified considerably. Additional flow parameters and/or operating parameters of the device can be reliably measured in addition to the flow rates.

In an exemplary embodiment, a total of at least four electrodes can be arranged in a measuring tube essentially in a half-circumferential region based on a cross section through the measuring tube, and when at least one signal is fed in at one of the electrodes or at one of the electrode pairs, an electrical current is measured at an electrode or between an electrode pair. An electrical voltage can be measured between at least one other electrode pair or with respect to a common connection to ground. When comparing measurements with two different electrode combinations in each case, different voltage and current values are related and it is thus possible to infer a filling level in the tube and/or electrode coating and/or oblique installation and/or sedimentation at the bottom of the tube and/or other possible diagnoses and/or it/they can be used to correct the flow rate.

Exemplary embodiments can determine the conductivity distribution inside the measuring tube by measuring voltages and/or currents inside the sensor unit whilst applying one or more voltages and/or currents to one or more electrodes. The voltages and/or currents can be measured at one or more electrodes, either relative to one another or with respect to a reference or connection to ground. In principle, an electric field could be generated and thus voltages and currents could also be generated by means of a magnetic field.

In this case, a multiplicity of electrodes, for example at least four, are used. This means that sufficient electrodes for a "permuting" combination of electrode pairs are available for recording measured values. This makes it possible to prevent the problem of the incorrect current or voltage measurement described at the outset. That is to say, the current and voltage can be measured at respectively different electrodes and distortion of the measurement by unknown electrode impedances can thus be avoided.

Exemplary embodiments can exploit a possibility of flexible feeding-in, with the result that voltage ratios are not formed with fixed feeding-in of current but rather current and voltage values determined for different electrode patterns can be combined in order to thus infer the filling level or other parameters. In practice, it has been proved to be worthwhile in this case to form impedances from the ratio of voltage and current in a first step since this can ensure independence from the intensity of the current being fed in.

A ratio of impedances can then be formed since this can ensure independence from the conductivity of the medium. However, this need not only be a simple quotient of two measured impedances but rather it has been found that other forms can allow a greater degree of sensitivity, such as if more than two impedance values are used for this purpose. In this case, a multiplicity of electrodes results in a spatial distribution pattern of the latter, thus enabling spatial measurement which enables a multiplicity of possible signal combinations in space. The variables can thus be measured in a considerably more sensitive manner.

Another exemplary advantage is that flowmeters as disclosed herein, such as inductive flowmeters can be set up in an extremely accurate manner during installation with a spirit level. The corresponding use of the multiplicity of electrodes with a corresponding distribution on the cross section of the measuring tube makes it possible to spatially measure parameters from the signals such that the oblique installation per se can be detected by means of a measurement, such as if asymmetric patterns are used.

This in turn can have the advantage that the oblique installation can be displayed on a display interface or the errors which normally arise as a result of the oblique installation can then be electronically compensated for in the measurement signal within the scope of particular tolerances. This can provide such an improvement in the flowmeter that installation is ultimately considerably simplified thereby.

Another exemplary advantageous refinement is that the electrodes can be acted on in such a manner that the voltage measurement and current measurement are not respectively effected via the same electrode pairs, thus meaning an unloaded method of measurement. Values for forming the impedance can be related, and, for example, the filling level in the measuring tube can be determined from the respective impedance and by comparing patterns.

Exemplary embodiments can determine the flow rate in a reliable manner in partially filled measuring tubes. Another exemplary advantageous refinement states that, in order to use the pattern comparison method and particular measured value ratios, corresponding patterns for determining the filling level or else corresponding patterns for electrode coating or oblique installation or other diagnosis can be stored in a memory unit and can be used as a basis for detecting progressive deviations or drifts and thus displaying errors at an early stage.

According to exemplary embodiments, eight electrodes can be provided, which electrodes are arranged in the lower half-circumferential region of the measuring tube and are acted on in the described manner. Depending on an approximate filling level determination carried out in a first step or by virtue of the last measured value, such an arrangement allows a special measurement pattern to be used using other electrodes (or electrode pairs).

The following applies to an exemplary configuration with four electrode pairs: measurement by feeding in at electrode pair 1 and 2 and measurement at electrode pair 3 and 4, then measurement by feeding in at electrode pair 1 and 3 and measurement at electrode pair 2 and 4, then possibly even measurement by feeding in at electrode pair 1 and 4 and measurement at pair 2, 3.

This is explained again further below.

In this case, the impedance need not be determined by a single measurement but rather may be determined with the aid of the superposition principle itself again by superimposing individual measurements. With this embodiment, the current can thus be measured between an electrode and a common connection to ground, whereas a current into a grounding electrode or a general device ground connection can be prevented when measuring between two electrodes using a corresponding electronic circuit. This can be explained using an example.

FIG. 1 shows an exemplary measurement principle which can be explained using the example of a filling level measurement with four electrodes in contact with the liquid. More electrodes can also be used, thus resulting in a plurality of possible combinations and thus a plurality of impedance values.

However, the principle remains the same in all applications. Four electrodes result in six possibilities for applying an electrical current between two electrodes. The voltage or voltage difference can be measured at the remaining unloaded electrodes. In this case, the signal applied can be an AC signal in the kilohertz range. The amplitudes of the currents and voltages at the electrodes can be determined by means of signal processing, such as demodulation, filtering and Fourier analysis.

Figure 2:
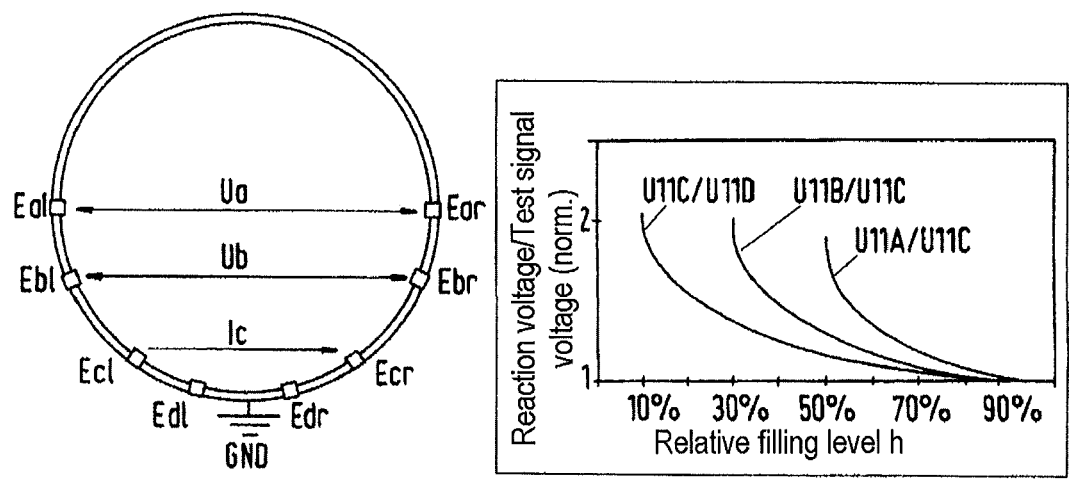
FIG. 2: shows a cross-sectional illustration of the exemplary signals produced.

An impedance value can be calculated from the ratio of voltage and current. The filling level in the tube can be inferred by comparing different impedance values, that is to say by forming the quotient or another ratio of the values. Measuring at least three impedance values can give a redundant measurement which can be used to infer a deviation in the conductivity of the tube, for example deposition or sinking of suspended matter, so-called sedimentation, in the flowmeter. FIG. 2 shows the cross section of an example in which the voltages can be directly determined on opposite sides.

Figure 3:
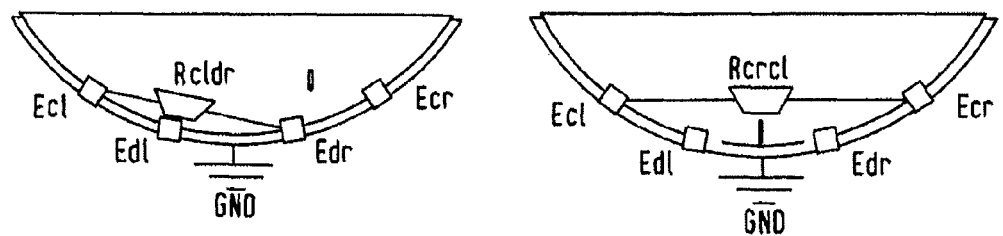
FIG. 3: shows an exemplary measurement of induced impedances.
Figure 3:
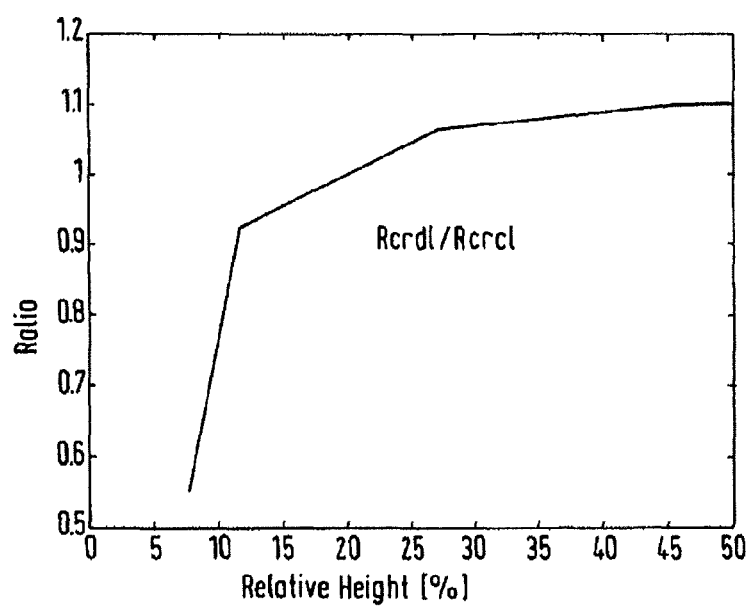

FIG. 3 shows an exemplary measurement of induced impedances $R_{lrdr} = (U_{cldr})/(I_{dlcr})$ as a function of the filling level. In this case, the voltage is measured between Ecl and Edr and the current flows from electrode dl to electrode cr etc. This shows the sensitivity of the ratio with respect to the filling level. This measurement is highly sensitive, for example, in a lower range of the filling level. The filling level can be determined therefrom by a suitable conversion. Forming ratios, for example the quotient, can reduce the dependence on the conductivity of the liquid since the impedances themselves can be proportional to the conductivity of the liquid.

The current filling level in the flowmeter can thus then be combined with the actual measurement of the induced voltage at two or more electrodes when a magnetic field is applied, for example by a calibration curve, and the flow rate can thus be inferred.

If the filling level is known, it is thus also possible to retroactively determine the conductivity of the medium. This can also be used to diagnose a process quality. Finally, such a measurement can also be combined with measurements at loaded electrodes in order to determine electrode impedances which make a direct statement on an electrode coating. The abovementioned different further operating parameters associated with the flow rate can thus be concomitantly taken into account, that is to say concomitantly measured.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for operating a flowmeter, comprising:
supplying a medium through a measuring tube and an arrangement of electrodes which are conductively connected to the medium depending on a filling level, wherein a total of at least four electrodes are arranged in the measuring tube essentially in a half-circumferential region based on a cross section through the measuring tube;
measuring an electrical current at one of the electrodes or between a pair of the electrodes when at least one signal is fed in at the electrodes;
measuring an electrical voltage between at least one other pair of the electrodes or with respect to a common connection to ground;
relating different voltage and current values when comparing measurements with two different electrode combinations to infer a diagnosis; and
correcting a flow rate based on the diagnosis.

2. The method as claimed in claim 1, comprising:
effecting each voltage measurement at electrodes or electrode pairs to which current is not applied such that an unloaded method of measurement is carried out; and
forming an impedance using related values which are used to determine the filling level.

3. The method as claimed in claim 1, comprising:
in a first step, calculating impedance values from voltage and current; and
relating the impedance values for different measurement patterns.

4. The method as claimed in claim 1, comprising:
storing measured value ratios formed for particular filling levels as patterns in a memory unit; and
inferring a current filling level of the medium by automatically comparing current measured values with these stored historical data.

5. The method as claimed in claim 1, comprising:
determining more than two measured values; and
determining a best value for the filling level by virtue of the comparison with measured values stored in the memory unit using a mathematical optimization.

6. The method as claimed in claim 1, comprising:
providing only four electrodes for the measured values, wherein these electrodes are each arranged opposite one another in pairs on a circumference; and
determining voltage values and current values by at least some of six measurements.

7. The method as claimed in claim 4, comprising:
providing more than four electrodes; and
selecting a measurement pattern based on a previous approximate determination of the filling level.

8. The method as claimed in claim 1, comprising:
comparing different measurements/filling level determinations with one another for redundancy to achieve measurement accuracy and/or robustness of the filling level measurement and/or to make possible a determination of the filling level where defective electrodes and/or electrodes which are not conductively connected to the measurement medium are present.

9. The method as claimed in claim 1, comprising:
determining additional process parameters by determining the induced voltages or currents.

10. The method as claimed in claim 1, comprising:
determining the filling level of liquid and detecting an inhomogeneous conductivity distribution in the tube to detect and determine sedimentation and/or another deposit in the measuring tube and/or a multiphase flow.

11. The method as claimed in claim 1, comprising:
inferring a coating of the measuring system; and
detecting a defect in an insulating tube lining of the measuring tube.

12. The method as claimed in claim 1, comprising:
detecting asymmetry on account of the flowmeter being oriented such that it is not straight or on account of another incorrect installation position of the flowmeter.

13. The method as claimed in claim 1, comprising:
correcting an oblique installation position during flow rate measurement using measured impedance.

14. The method as claimed in claim 1, comprising:
determining conductivity of the medium by determining impedances.

15. The method as claimed in claim 1, comprising:
successively feeding the current via a respective electrode connected to common ground and/or measuring the voltage at a respective electrode connected to ground.

16. The method as claimed in claim 1, comprising:
successively measuring voltages at the electrodes in time-division multiplexing.

17. The method as claimed in claim 1, wherein the diagnosis is at least one of a filling level in the tube and/or an electrode coating and/or an oblique installation and/or sedimentation at a bottom of the measuring tube.

18. A method for operating a flowmeter, comprising:
supplying a medium through a measuring tube and an arrangement of electrodes which are conductively connected to the medium depending on a filling level, wherein at least four electrodes are arranged essentially within a half-circumferential region of the measuring tube;
measuring an electrical current at one of the electrodes or between a pair of the electrodes when at least one signal is fed in at the electrodes;

measuring an electrical voltage between at least one other pair of the electrodes or with respect to a common connection to ground;

comparing measurements with two different electrode combinations to infer a diagnosis; and correcting a flow rate based on the diagnosis.

19. The method as claimed in claim 18, wherein the diagnosis is at least one of a filling level in the tube and/or an electrode coating and/or an oblique installation and/or sedimentation at a bottom of the measuring tube.

20. The method as claimed in claim 19, comprising:

comparing different measurements/filling level determinations with one another for redundancy to achieve measurement accuracy and/or robustness of the filling level measurement and/or to make possible a determination of the filling level where defective electrodes and/or electrodes which are not conductively connected to the measurement medium are present.

\* \* \* \* \*